Nov. 25, 1930. C. CLENCH 1,783,073
BALANCING OF CRANK SHAFTS
Filed Feb. 26, 1929
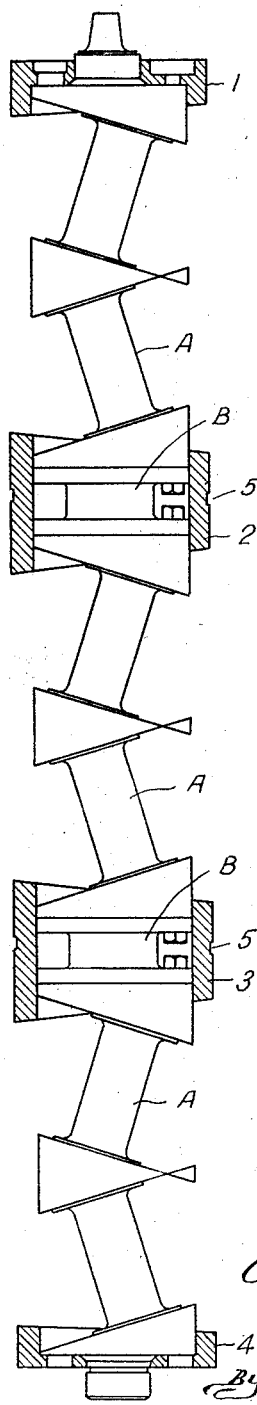
Inventor
Claude Clench
By James L. Norris,
Attorney Patented Nov. 25, 1930

1,783,073

UNITED STATES PATENT OFFICE

CLAUDE CLENCH, OF DUMFRIES, SCOTLAND

BALANCING OF CRANK SHAFTS

Application filed February 26, 1929, Serial No. 342,750, and in Great Britain March 31, 1928.

This invention relates to the balancing of crank shafts and more particularly to the balancing of crank shafts for use in automobile work.

According to the invention the weights necessary to balance the crank shaft are in the form of rings or sleeves which are fitted over the shaft at the desired point or points and also form the journal bearing or bearings of the shaft.

For example, if a crank shaft is made in two or more sections, bolted or otherwise secured together, the balancing weights may be in the form of rings or sleeves fitted one at each end of the complete shaft and one over each joint between the sections, the said rings or sleeves being shaped to form the journal bearings of the shaft.

The invention is particularly applicable for use in connection with a valve operating shaft of the wobble type for internal combustion engines having slide or sleeve valves.

The accompanying drawing is a part sectional plan view of a six throw crank shaft of the wobble type for operating the sleeve valves of an internal combustion engine having the invention applied thereto.

Reference to the drawing, the shaft is shown as made in three sections A connected together by bolting to the coupling pieces B. The weights necessary to balance the shaft are calculated in any suitable manner and are then distributed over the shaft in the form of sleeves or rings 1, 2, 3, 4, the sleeves 1, 4 being secured over the ends of the shafts and the sleeves 2, 3 over the section joints as shewn. The sleeves or rings may be shrunk on or secured in any suitable manner and the outer faces of the sleeves are shaped to form the journal bearings of the shaft. Oil grooves such as 5 may be provided in the sleeves if desired. It will be obvious that the invention may be applied to shafts formed in any number of sections and the balancing sleeves or rings may be fitted over the ends of some of the sections only if desired.

Having thus described the nature of my said invention and the best means I know of carrying the same into practical effect, I claim:—

1. A crank shaft comprising in combination a series of sections, flanges on the ends of each section, bolts connecting the adjacent flanges of the sections together, and balancing rings, one on each end of the shaft and one over each flanged joint, said balancing rings being shaped to form the journal bearings of the shaft.

2. A crank shaft comprising a series of flanged sections bolted together and balancing rings mounted on the joints between said sections and forming the journal bearings for the shaft.

In testimony whereof I have signed my name to this specification.

CLAUDE CLENCH.